United States Patent [19]

Ofner et al.

[11] Patent Number: 5,678,524
[45] Date of Patent: Oct. 21, 1997

[54] INJECTION SYSTEM FOR AN INTERNAL COMBUSTION ENGINE

[75] Inventors: Herwig Ofner, Stübing; Denis Walter Gill, Hitzendorf, both of Austria

[73] Assignee: AVL Gesellschaft Für Verbrennungskraftmaschinen Und Messtechnik M.B.H. Prof.Dr.Dr.h.c. Hans List, Graz, Austria

[21] Appl. No.: 644,500

[22] Filed: May 10, 1996

[30] Foreign Application Priority Data

May 19, 1995 [AT] Austria ...................... 274/95

[51] Int. Cl.$^6$ .................................................. F02M 21/04
[52] U.S. Cl. ............................................................ 123/527
[58] Field of Search ........................... 123/527, 525, 123/526, DIG. 5; 417/383, 386, 387, 388

[56] References Cited

U.S. PATENT DOCUMENTS

| | | | |
|---|---|---|---|
| 2,735,369 | 2/1956 | Turvey | 417/383 |
| 3,930,756 | 1/1976 | Bruggeman | 417/383 |
| 4,365,745 | 12/1982 | Beck | 417/387 |
| 4,648,810 | 3/1987 | Schippers et al. | 417/383 |
| 4,662,828 | 5/1987 | Tapia | 417/388 |

*Primary Examiner*—Erick R. Solis
*Attorney, Agent, or Firm*—Watson Cole Stevens Davis, P.L.L.C.

[57] ABSTRACT

An injection system for an internal combustion engine, in particular an engine operating on liquid gas as fuel or fuel component, includes an injection unit for each cylinder for direct fuel injection into the combustion chamber, and a fuel supply system with at least one fuel tank and an oscillating pump element configured as a displacer for delivery of the fuel. The pump element is provided with an elastic sealing element fitted in a housing and which divides a pump chamber into two subchambers sealed tightly against each other, the first subchamber being supplied with fuel via a fuel feed line of the fuel supply system, and the second subchamber being supplied with a secondary medium. The dead volumes of the pump element may be reduced by configuring the pump chamber as an annular chamber at least partially surrounding a shaft moving axially in a cylinder, which shaft is mechanically linked with the sealing element.

10 Claims, 3 Drawing Sheets

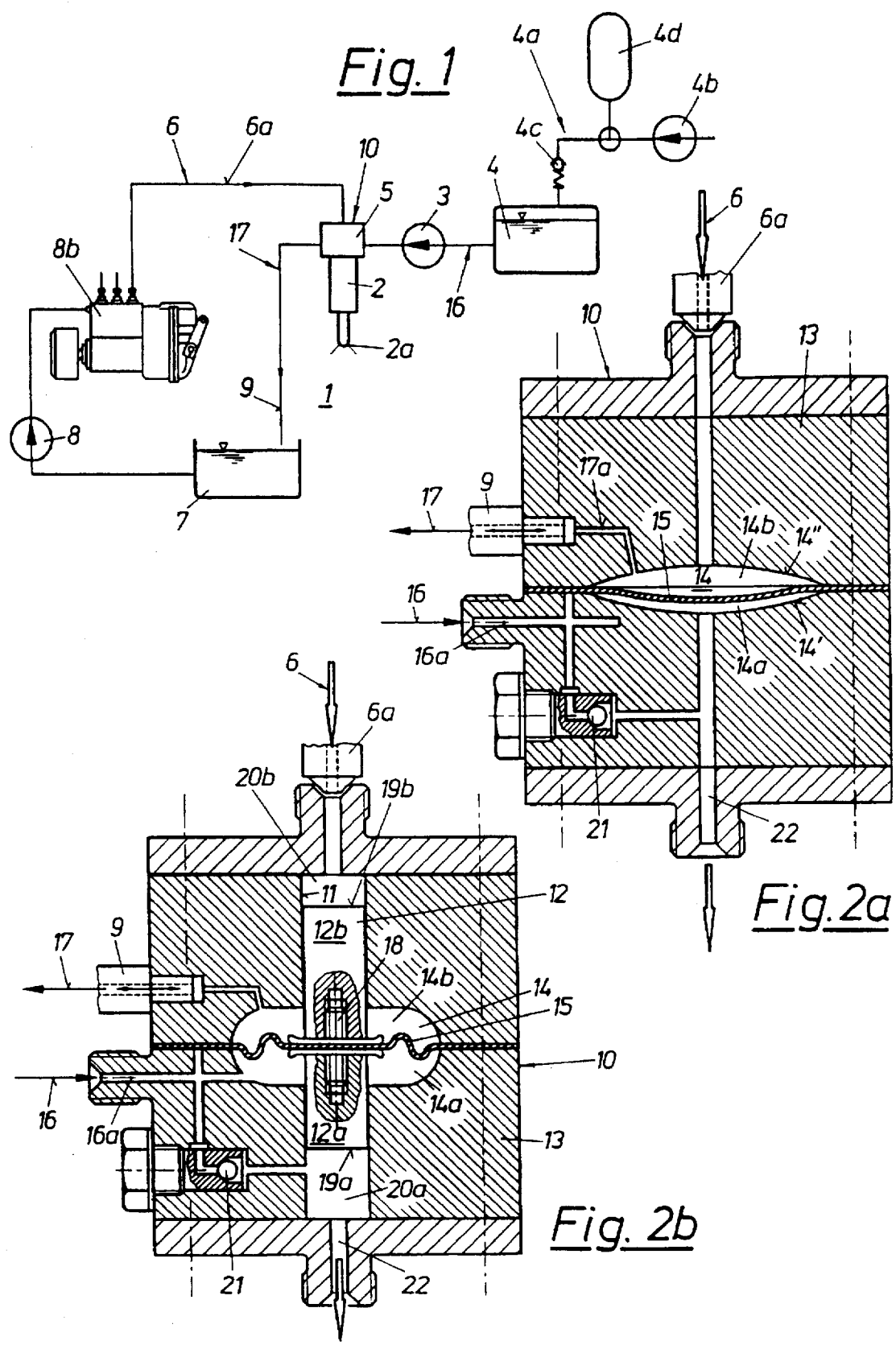

INJECTION SYSTEM FOR AN INTERNAL COMBUSTION ENGINE

BACKGROUND OF THE INVENTION

The present invention relates to an injection system for an internal combustion engine operating on liquid gas as fuel or fuel component, with an injection unit per cylinder for direct fuel injection into the combustion chamber, and a fuel supply system with at least one fuel tank and an oscillating pump element configured as a displacer for delivery of the fuel, the pump element being provided with an elastic sealing element fitted in a housing which divides a pump chamber into two subchambers sealed tightly against each other, the first subchamber being supplied with fuel via a fuel feed line of the fuel supply system, and the second subchamber being supplied with a secondary medium.

DESCRIPTION OF THE PRIOR ART

Commercial injection systems are designed for injecting either self-igniting or extraneously ignited liquid gas fuels. At conditions of ambient pressure and ambient temperature such fuels are provided in liquid form; as a consequence, the storage tank is non-pressurized.

Usually the liquid fuel is simultaneously employed as a lubricant for movable parts of the injection system. For this reason provisions are made for leakages and oil leakage pipes leading back to the tank. A known kind of fuel used in this context is a liquid gas stored under pressure. Conventional liquid gases such as propane or butane are fuels whose ignition is effected by outside means and which are introduced into the combustion chamber as gases premixed with air (fuels for use with spark ignition engines of the Otto type).

Newly developed liquid gas fuels with high cetane number, such as dimethyl ether, have a vapor pressure of less than 30 bar at ambient temperature and may be used as self-igniting fuels. If such liquid gases are used with conventional diesel injection systems, the danger of cavitation will rise on account of the high vapor pressure of such fuels, in particular in areas of a local pressure drop, which will lead to fuel delivery problems and increased wear. For this reason the liquid gas must be kept at a pressure level significantly above vapor pressure. Fuel leakages from the system into the environment must be prevented by all means since the fuel evaporates under normal ambient conditions and could form an ignitible or explosive mixture together with air. The prevention of leakages is rendered difficult by the high permanent pressure that must be maintained in the system to keep the fuel in its liquid state. Leakages are often encountered with aggregate units of the injection system featuring a movable shaft sliding in a cylinder, such as high-pressure plunger pumps, pump elements of the injection unit, hydraulic pressure transformation elements as well as in the needle guide of the fuel needle of the injection unit.

In U.S. Pat. No. 4,662,828 an injection system of the type mentioned above is disclosed wherein the pump element features a sealing element which is configured as a fitted membrane dividing a pump chamber into two subchambers. The sealing element is used to separate the engine fuel from a secondary medium. The drawback of that system is that there are comparatively large dead volumes on either side of the sealing element. A pump element of this known type is shown in FIG. 2a.

SUMMARY OF THE INVENTION

It is an object of the invention to avoid such disadvantages and to reduce the dead volumes in the pump element in an injection system of the afore-mentioned type while providing a reliable seal against the environment or other operating media.

In the invention this object is achieved by configuring the pump chamber as an annular chamber at least partially surrounding a shaft moving axially in a cylinder, which shaft is mechanically linked with the sealing element. In this way the pump force is transmitted to the sealing element in a purely mechanical way.

The secondary medium acts both on the shaft working as transmission plunger and on the second subchamber to provide a pressure relief for the sealing element. Due to the axially movable shaft, the dead volumes are kept small.

The secondary medium cooperates with an external oscillating pressure generating element. The device used in this context may be a multi-unit pump, a distributor pump, or a single pump of a conventional injection system.

The sealing element may be configured as a membrane or as a bellow-type element. The use of membrane elements may reduce the building height, whereas bellow-type elements will permit a more slender design.

It is proposed by the invention that the sealing element surround the shaft so as to provide a tight seal. The sealing element has an axial bore fitting sealingly around the shaft. The shaft passes through the sealing element and may thus be configured in one piece.

In another preferred variant of the invention the shaft is configured in two parts which are axially separated from each other, at least partly, by the sealing element. The two parts of the shaft may be held together by means of a bolt going through the sealing element. It is considered more convenient, however, that the sealing element have no bore, and that the two parts of the shaft be completely separated from each other by the sealing element, a spring-loaded pressure plate being preferably inserted between the sealing element and either part of the shaft. In this instance the sealing element need not have an axial bore, thereby reducing the number of necessary sealing surfaces. As one part of the shaft acts on either side of the sealing element, the two parts may have different diameters, thus providing a simple means of hydraulic pressure intensification or reduction. Moreover, no double fits will be required.

It is further provided in a very advantageous variant that the second subchamber be subject to the pressure of the fuel supply system by means of the secondary medium, preferably a hydraulic fluid.

The pump element may be part of a high-pressure pump for a storage injection system, or part of a pump-nozzle unit.

BRIEF DESCRIPTION OF THE DRAWINGS

The invention will be further described with reference to the accompanying drawings, in which FIG. 1 shows a first example of an injection system with a schematically indicated pump element, FIG. 2a shows a pump element of a known type in detail, FIG. 2b shows a variant of a pump element of the invention.

Elements of the same function have the same reference numbers.

DETAILED DESCRIPTION OF PREFERRED EMBODIMENTS

Figure 3:
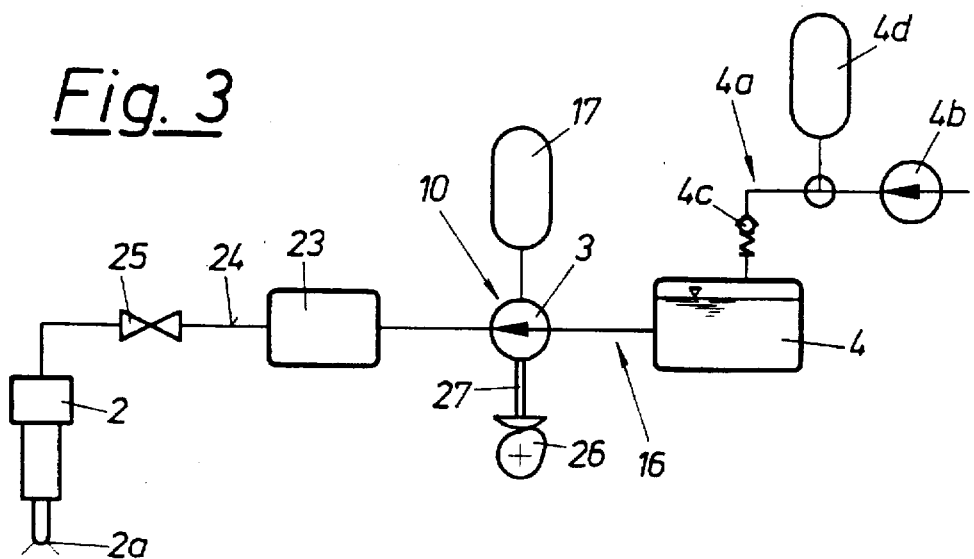
FIG. 3 shows a second example of an injection system, with a second variant of the pump element of the invention.

FIG. 1 shows an injection system 1 with an injection unit 2 for direct injection of liquid gas fuel into a combustion chamber of an internal combustion engine, not shown here in detail. Via the fuel delivery device 3 the injection unit 2 is supplied with liquid gas fuel, which latter is taken from a fuel tank 4. The injection unit 2 is configured as a pump-nozzle unit with a pump element 10 as described by the invention.

The pump-nozzle unit 5 is operated by an actuating unit 6 with a separate hydraulic system, comprising a container 7, a fore-pump 8a and a main pump 8b. The main pump 8b may be a multi-unit pump, a distributor pump, or a single pump. A leakage pipe 9 extends between pump unit 5 and container 7. By means of a pressure control unit 4a the pressure in the fuel tank 4 is maintained at a constant level above vapor pressure, for instance, between 6 and 30 bar, if dimethyl ether is used. The pressure control unit 4a includes a gas delivery device 4b delivering air or nitrogen into the interior of the liquid gas tank 4 via a checkvalve 4c. If required, a pressure vessel 4d may be provided between gas delivery device 4b and liquid gas tank 4. The fuel supply system is referred to as 16, and the pressure relief system as 17.

FIG. 2a shows a plungerless pump element 10 of a known type. Into a pump chamber 14 of a housing 13 an elastic sealing element 15 is fitted. The sealing element 15 divides the chamber 14 into a first subchamber 14a and a second subchamber 14b. Via a fuel feed line 16a of the fuel supply system 16 and a checkvalve 21 fuel is introduced into the first subchamber 14a of the pump element 10. A secondary medium, such as motor oil, diesel oil or hydraulic fluid, is oscillatingly fed to the second subchamber 14b by means of an external actuating system 6 and a hydraulic line 6a. The pressure pulsations are directly transmitted to the fuel in the subchamber 14a via the membrane 15. The second subchamber 14b is connected, preferably by a thottle bore 17a, to a pressure relief system 17, which in the plungerless variant of the pump element 10 may be constituted by a simple leakage pipe 9. The reference numbers 14' and 14" refer to the walls of subchambers 14a and 14b. The disadvantage of this design is the relatively large dead volume in subchambers 14a and 14b.

FIG. 2b shows a variant of the pump element 10 as described by the invention. The pump element 10 consists of a shaft 12 for force transmission that is axially movable in a cylindrical bore 11, and a housing 13 forming an annular pump chamber 14 partially surrounding the shaft. 12, which chamber 14 is divided by an elastic sealing element 15 into a first subchamber 14a and a second subchamber 14b. The first subchamber 14a is connected to a fuel supply system 16, the second subchamber 14b via the secondary medium to a relief system 17, such as the leakage pipe 9.

The shaft 12 consists of a first part 12a and a second part 12b, which are located one on either side of the sealing element 15 configured as a membrane. The centre of the sealing element 15 is pierced by a bolt 18 holding together the two parts of the shaft, 12a and 12b. The first part 12a adjacent to the first subchamber 14a may constitute the working plunger of a plunger pump or a hydraulic pressure transformation element, for instance, though it may also be configured as needle shaft of the injection unit 2. The front end 19a facing away from the sealing element 15 is next to a working space 20a which is connected to the liquid gas supply system 16 via a checkvalve 21 on the inlet side. The outlet opening 22 of the working space 20a is in an area of housing 13 opposite of the front end 19a. Depending on whether the shaft 12 is part of a plunger pump or a hydraulic pressure transformation element, or constitutes the needle shaft of the injection unit, the outlet opening 22 leads to a liquid gas high-pressure storage cell, to the valve space of the injection unit, or directly into the combustion chamber of the engine.

In the variant shown in FIG. 2b, part 12b of the shaft is configured as hydraulic actuating plunger, whose front end 19b facing away from the sealing element 15 is adjacent to an actuating space 20b, into which opens the hydraulic line 6a of an external actuating system 6. It is essential in this instance that the same pressure should prevail in the two subchambers 14a and 14b in order to make sure that the sealing element 15 is subject to as little mechanical load as possible.

FIG. 3 shows an injection system 1 configured as a storage injection system in which liquid gas is drawn from a liquid gas tank 4 and delivered to a high-pressure distributor cell 23 by means of the fuel delivery device 3 configured as high-pressure pump. From the high-pressure distributor cell 23 one injection line 24 leads to each injection unit 2. The injection control element has the reference number 25. In the shown variant the fuel delivery device 3 is provided with a pump element 10 of the invention.

Figure 4:
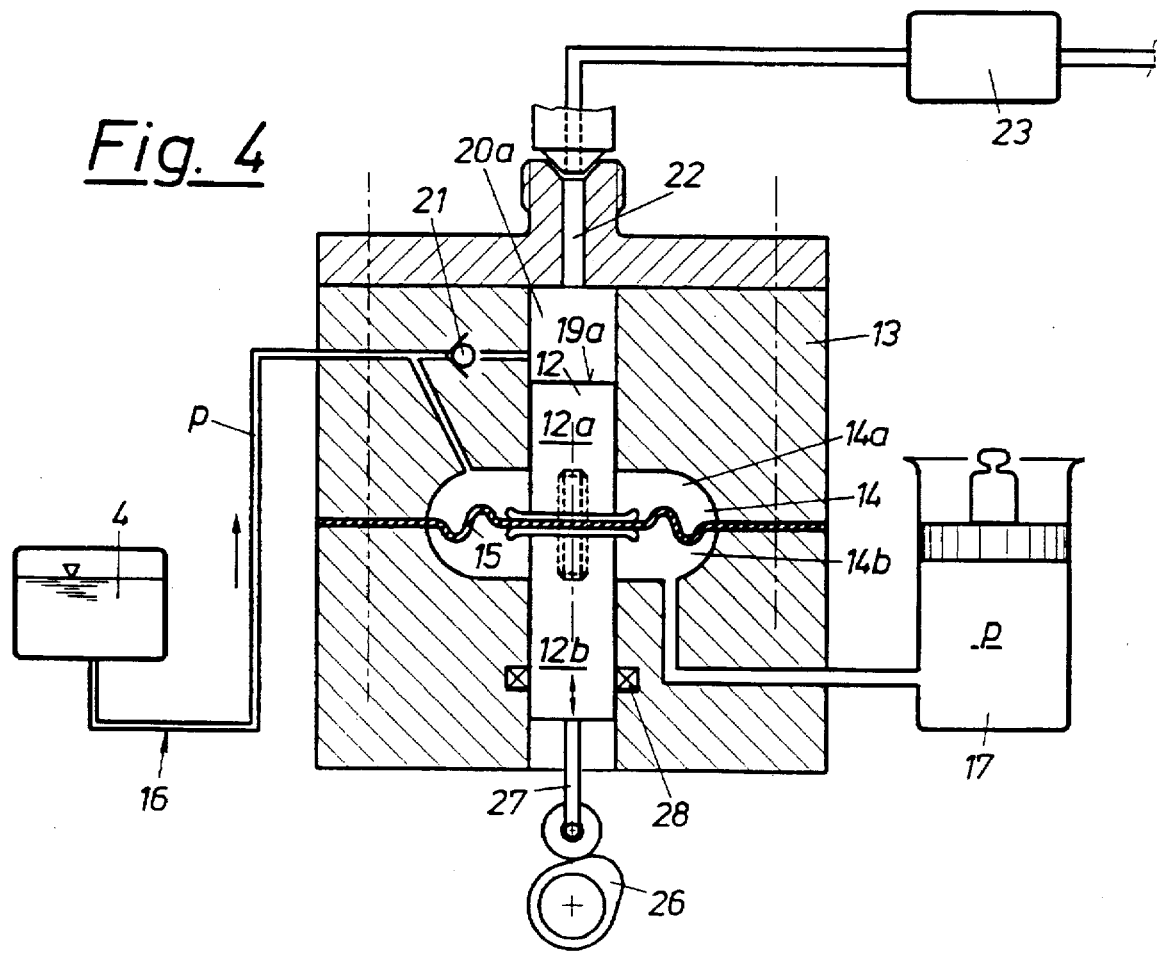
FIG. 4 shows the pump element of FIG. 3 in detail.

FIG. 4 shows the delivery device 3 of FIG. 3 in detail, which is configured as a pump element 10. Unlike in FIG. 2b, part 12b of the shaft constituting the actuating plunger is driven mechanically, as indicated by cams 26 and tappet 27. From the fuel supply system 16 the liquid gas fuel will enter the working space 20a via the checkvalve 21, and also the first subchamber 14a, which is separated from the second subchamber 14b by the sealing element 15. The second subchamber 14b is connected to a pressure relief system 17. The relief system 17 may simply be formed by a hydraulic tank which is maintained at the same pressure p as the liquid gas tank 4. The system shown in FIG. 4 for sealing and separating the liquid gas from its environment has the advantage that part 12b of the shaft must be sealed only against the hydraulic fluid of the relief system 17, whose viscosity may be selected more or less as desired, such that the sealing 28 need not be leakage-free. This will considerably reduce the sealing requirements for the liquid gas itself and increase the operational safety of the system.

Figure 5:
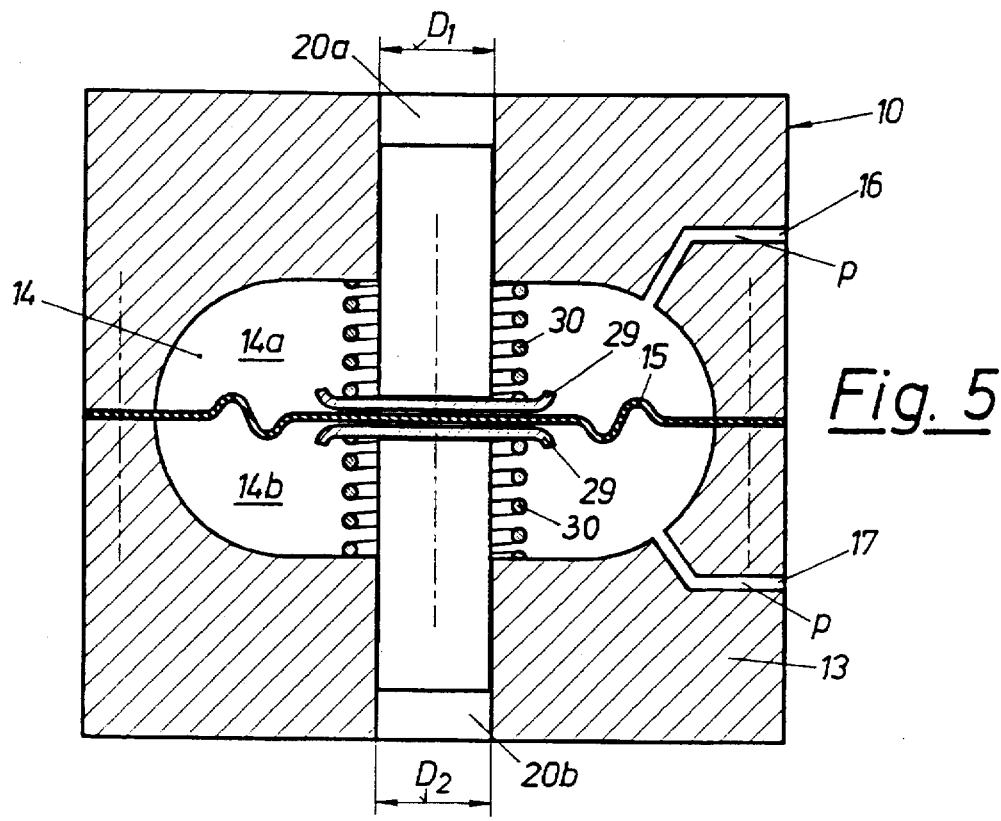
FIGS. 5 and 6 show other variants of pump elements according to the invention.
Figure 6:
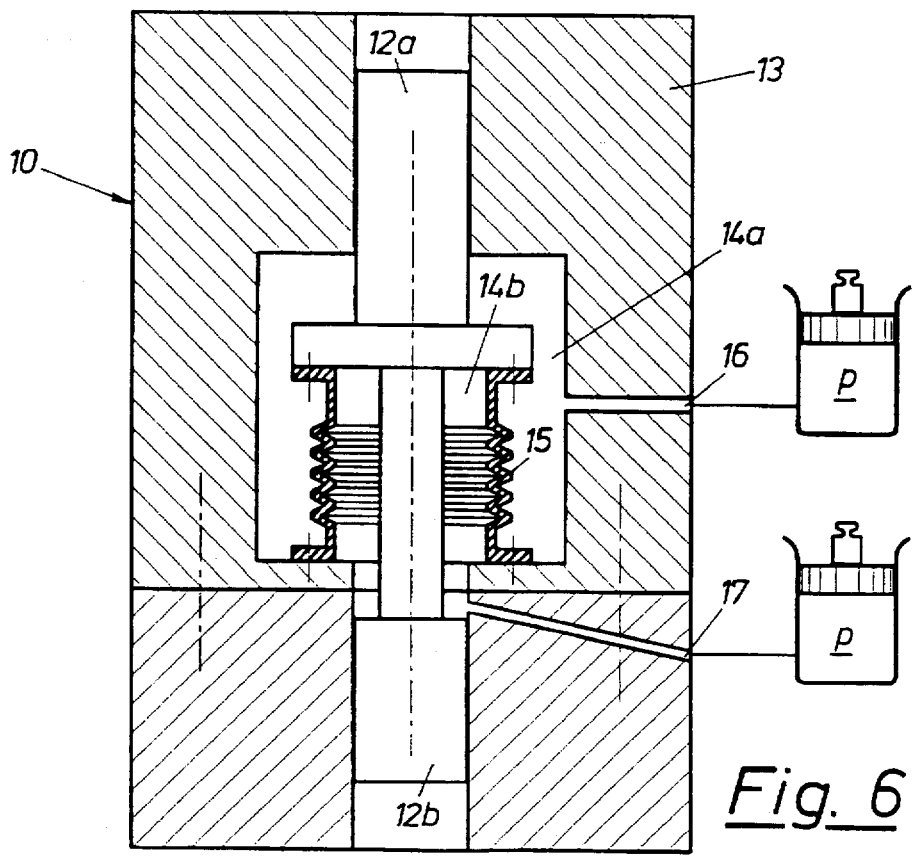

FIG. 5 shows a pump element 10 of the invention in which the two parts of the shaft, 12a and 12b, are completely separated from each other by the sealing element 15 configured as a membrane. Between the membrane 15 and each part 12a, 12b pressure plates 29 are inserted, which are pressed against the sealing element 15 by the force of springs 30. Due to the fact that in this arrangement the sealing element 15 is not pierced in its center, its mechanical strength remains intact and the number of sealing surfaces is reduced. Moreover, this will provide a simple means of hydraulic pressure intensification or reduction, by giving diameters $D_1$ and $D_2$ different dimensions, as no double fit will be necessary.

FIG. 8 shows a variant of the pump element 10 of the invention featuring a bellow-type sealing element 15. The advantage of this variant is that the design of the pump element 10 is kept slender and space is saved.

The pump element 10 described by the invention is particularly well suited for use with conventional diesel engines whose fuel system is to be converted to operation on liquid gas, preferably dimethyl ether. In such instances a conventional injection system may be used for actuation of the pump element. The secondary medium, such as diesel oil or motor oil, is employed as actuating or pressure relief medium. In this way a conventional injection system may easily and inexpensively be converted into a liquid gas injection system, permitting the use of many commercially available components.

Moreover, the pump element of the invention will permit both hydraulically- and mechanically-operated actuating systems for liquid gas injection, either of which may be realized in a simple manner.

Applications of the invention are in no way limited to liquid gas fuel systems. Rather, the invention is ideal for use with all applications employing fuels with difficult properties as regards material and environmental compatibility, or dangerous substances.

We claim:

1. An injection system for an internal combustion engine such as an engine operating on liquified gas at least as fuel component, comprising an injection unit for each cylinder for direct fuel injection into the combustion chamber, and a fuel supply system with at least one fuel tank and an oscillating pump element configured as a displacer for delivery of the fuel, said pump element being provided with an elastic sealing element fitted in a housing which divides a pump chamber into two subchambers sealed tightly against each other, the first subchamber being supplied with fuel via a fuel feed line of the fuel supply system and the second subchamber being supplied with a secondary medium, wherein said pump chamber is configured as an annular chamber at least partially surrounding a shaft moving axially in a cylinder, which shaft is mechanically linked with said sealing element, wherein a front end of said shaft is adjacent a working space which is connected to said fuel supply system by a checkvalve which opens towards said working space.

2. An injection system according to claim 1, wherein said sealing element surrounds said shaft so as to provide a tight seal.

3. An injection system according to claim 1, wherein said shaft is configured in two parts which are at least partially axially separated from each other by said sealing element.

4. An injection system according to claim 3, wherein said two parts of said shaft are held together by means of a bolt extending through the sealing element.

5. An injection system according to claim 3, wherein said sealing element has no bore, and wherein said two parts of said shaft are completely separated from each other by said sealing element, a spring-loaded pressure plate being inserted between said sealing element and either part of said shaft.

6. An injection system according to claim 1, wherein said second subchamber is subject to the pressure of said fuel supply system by means of the secondary medium.

7. An injection system according to claim 1, wherein said pump element is a high-pressure pump.

8. An injection system according to claim 1, wherein said pump element is part of a pump-nozzle unit.

9. An injection system according to claim 1, wherein said sealing element is configured as a bellow-type element.

10. An injection system for an internal combustion engine comprising an injection unit which can inject fuel directly into a combustion chamber of a cylinder and a fuel supply system for supplying liquified fuel to said injection unit, said injection unit comprising a housing which defines a bore therein and an annular pump chamber around a portion of said bore, a shaft which extends along said bore and through said annular pump chamber to a first end which faces a working space defined within said housing and an opposite second end, an elastic sealing element which extends through said annular pump chamber to divide said annular pump chamber into first and second subchambers, and said housing defining a first passageway with a checkvalve for delivering fuel from said fuel supply system to said working space, a second passageway for delivering fuel to said first subchamber, a third passageway for delivering a secondary medium to said second subchamber, and an outlet opening in communication with said working space for delivering fuel from said working space, due to movement of said shaft along said bore, into a combustion chamber of a cylinder.

* * * * *